United States Patent
Xu et al.

(10) Patent No.: US 9,088,327 B2
(45) Date of Patent: Jul. 21, 2015

(54) SYSTEMS AND METHODS FOR CHANNEL QUALITY INDICATOR (CQI) SELECTION FOR NON-DETERMINISTIC RECEIVERS

(71) Applicant: Marvell World Trade Ltd., Hamilton (BM)

(72) Inventors: Mingguang Xu, Sunnyvale, CA (US); Yakun Sun, Sunnyvale, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/248,758

(22) Filed: Apr. 9, 2014

(65) Prior Publication Data

US 2014/0301509 A1    Oct. 9, 2014

Related U.S. Application Data

(60) Provisional application No. 61/809,978, filed on Apr. 9, 2013.

(51) Int. Cl.
| | |
|---|---|
| H04B 1/10 | (2006.01) |
| H04L 1/00 | (2006.01) |
| H04B 17/309 | (2015.01) |

(52) U.S. Cl.
CPC ............ H04B 1/1027 (2013.01); H04B 17/309 (2015.01); H04L 1/0026 (2013.01)

(58) Field of Classification Search
USPC ......... 375/259, 260, 285, 316, 295, 340, 346, 375/347, 348, 349
See application file for complete search history.

(56) References Cited

U.S. PATENT DOCUMENTS

| | | | | |
|---|---|---|---|---|
| 8,144,797 | B2 * | 3/2012 | Mujtaba et al. | 375/267 |
| 8,817,904 | B2 * | 8/2014 | Collotta et al. | 375/267 |
| 8,855,026 | B2 * | 10/2014 | Maattanen et al. | 370/278 |
| 2008/0026783 | A1 * | 1/2008 | Lee | 455/522 |
| 2010/0041344 | A1 | 2/2010 | Kim et al. | |

OTHER PUBLICATIONS

International Search Report and Written Opinion dated Oct. 28, 2014 in International Application No. PCT/US2014/033505.
Partial International Search Report dated Aug. 14, 2014 in International Application No. PCT/US2014/033505.

* cited by examiner

*Primary Examiner* — Siu Lee (57) ABSTRACT

Systems and methods are provided for determining a channel quality indicator (CQI) for receivers that exhibit non-deterministic behavior during the CQI selection process. A codeword is received over a transmission system at a receiver, and a performance measure that is dependent on the CQI is determined for the codeword. The receiver determines an objective function that is based on the CQI and the performance measure, and selects a value for the CQI by performing an optimization technique on the objective function. The optimization technique is performed on the objective function over a range of candidate CQI values, and the selected value for the CQI is the candidate CQI value that optimizes the objective function.

20 Claims, 5 Drawing Sheets

SYSTEMS AND METHODS FOR CHANNEL QUALITY INDICATOR (CQI) SELECTION FOR NON-DETERMINISTIC RECEIVERS

CROSS-REFERENCE TO RELATED APPLICATION

This application claims benefit under 35 U.S.C. §119(e) of U.S. Provisional Application No. 61/809,978, filed Apr. 9, 2013, which is hereby incorporated herein by reference in its entirety.

FIELD OF USE

This disclosure relates generally to communication systems, and more particularly to selecting a channel quality indicator (CQI) for a non-deterministic receiver.

BACKGROUND

In a data transmission system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

However, the transmitter may be unaware of how the channel will affect a transmitted signal, and may not be able to transmit information in a way that will be effective for a particular channel. For example, the transmitter may be a wireless router, where the channel varies depending on its surroundings. One technique to increase reliability when the transmitter does not have information about the channel is to use a CQI scheme to communicate channel conditions from the receiver to the transmitter. For example, a transmitter may transmit reference or pilot signals to the receiver. The receiver may process the received pilot signals to generate channel feedback information corresponding to the current conditions of the transmission channel. This feedback computed by the receiver may be referred to as Channel Quality Indicator (CQI) and may be based on any suitable channel parameter such as Signal-to-Interference and Noise Ratio (SINR), Signal-to-Noise Ratio (SNR), Signal-to-Noise plus Distortion Ratio (SNDR), power of received signal, supportable data rates, supportable modulation and/or coding rates, and supportable throughput. The receiver may then transmit the CQI information to the transmitter, e.g., in the form of a CQI message. The transmitter may use the CQI information to determine suitable transmission parameters and/or schemes, such as the number of transmit antennas to activate, the modulation and coding rates, and/or the bandwidth allocation.

SUMMARY

In view of the foregoing, systems and methods are provided for determining a channel quality indicator (CQI) for receivers that exhibit non-deterministic behavior during the CQI selection process.

In some embodiments, a CQI is determined in a transmission system. A codeword is received over the transmission system at a receiver, and a performance measure that is dependent on the CQI is determined for the codeword. The receiver determines an objective function that is based on the CQI and the performance measure, and selects a value for the CQI by performing an optimization technique on the objective function. The optimization technique is performed on the objective function over a range of candidate CQI values, and the selected value for the CQI is the candidate CQI value that optimizes the objective function.

BRIEF DESCRIPTION OF THE DRAWINGS

The above and other aspects and potential advantages of the present disclosure will be apparent upon consideration of the following detailed description, taken in conjunction with the accompanying drawings, in which like reference characters refer to like parts throughout, and in which.

DETAILED DESCRIPTION

The present disclosure generally relates to estimating a channel quality indicator (CQI) in a transmission system. In particular, systems and methods are described for selecting a CQI (or CQI value) for receivers that exhibit non-deterministic behavior during the CQI selection process. It is generally desirable to provide an accurate CQI. In particular, an underestimate of a CQI value means that the link resources are not being fully utilized, while an overestimate of a CQI value means that data transmission is more likely to fail. Under ideal conditions, in which complete channel state information is known and channel conditions do not fluctuate, CQI selection methods perform well.

However, providing an accurate estimate of CQI may be difficult in fluctuating channel conditions (such as in wireless links, for example) because the CQI may be different at different times or positions along the length of the channel. Moreover, CQI selection is difficult when the receiver exhibits non-deterministic behavior. In an example, non-deterministic behavior exhibited by a receiver may result from codeword decoding in which the result of the decoding is unknown until the decoding is performed. In this case, the probabilistic results of successful codeword decoding may be determined before the decoding is performed and used in CQI selection. Moreover, a receiver's non-deterministic behavior may result from a time-varying channel and various noise conditions that affect the processing of the receiver. In an example, in systems that use successive interference cancellation (SIC), a receiver sets the ordering of codeword decoding differently for different real-time channel and noise conditions, even for the same set of CQI values.

Figure 1:
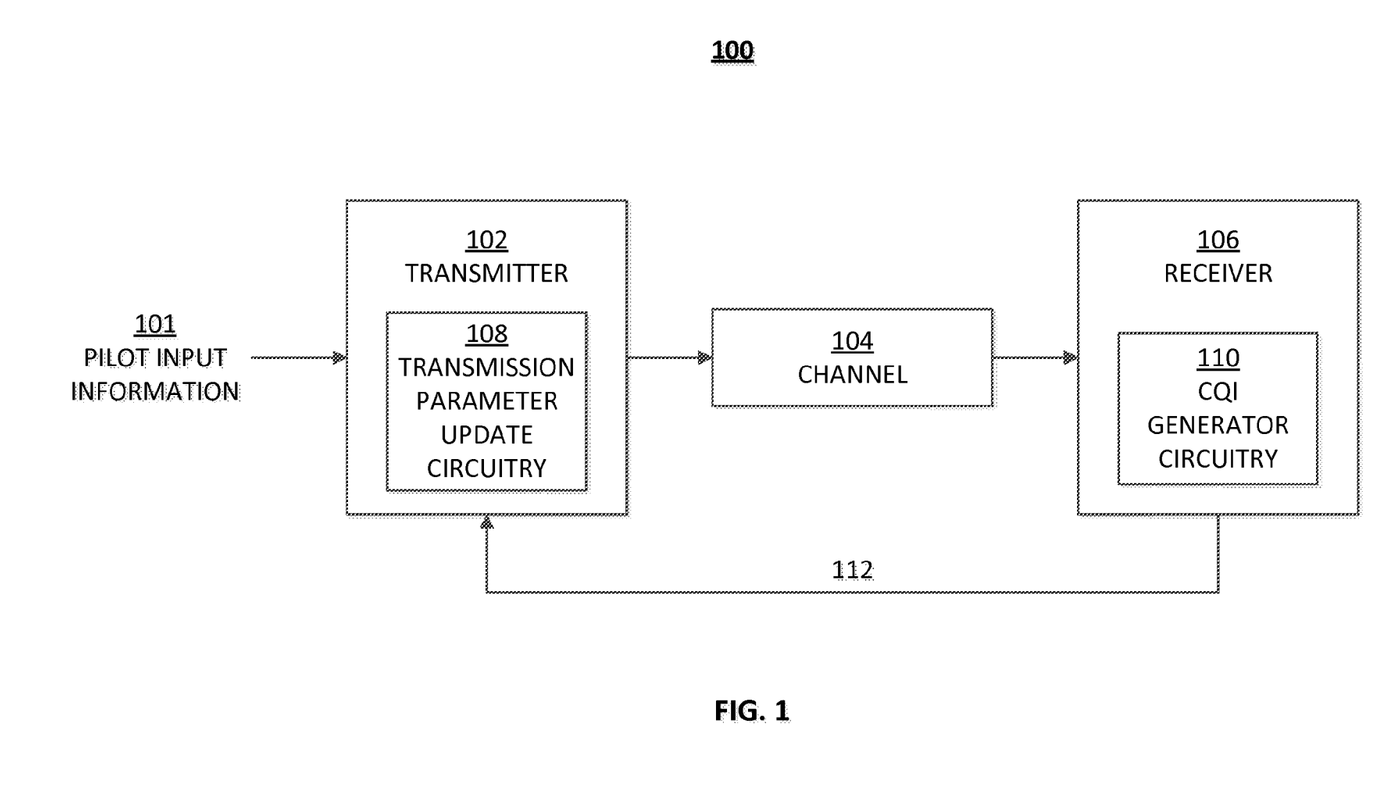
FIG. 1 is a high level block diagram of a data transmission system, in accordance with embodiments of the present disclosure.

FIG. 1 is a simplified block diagram of a communication system 100 that determines CQI in accordance with some embodiments. Communication system 100 includes a transmitter 102, a channel 104, and a receiver 106. In some embodiments, data to be transmitted may be divided between a large number of transmission systems such as system 100, where each system corresponds to one parallel transmission. For example, system 100 may correspond to one subcarrier that carries data in a particular frequency range, or a tone. In some embodiments, the system 100 may represent a wireless communication system. In these embodiments, transmitter 102 may be a wireless router and receiver 106 may be a wireless receiver, such as a mobile telephone, computer, laptop, hand held device, or other such device. The components shown in transmitter 102 and receiver 106 may be implemented by a single integrated circuit (IC) or as separate components in a circuit board or implemented on a programmable logic device. These components may be implemented on separate devices or circuits and networked together.

Transmitter 102 communicates with receiver 106 through channel 104. Transmitter 102 and receiver 106 may each include one or more antennas. In a wireless communication system, channel 104 may be the physical space between the antennas of transmitter 102 (referred to as "transmit antennas" below) and the antennas of receiver 106 (referred to as "receiver antennas" below), which obstructs and attenuates the transmitted signals due to at least time varying multipath fades and shadowing effects. One or more additive noise sources z may, for example, be ambient electromagnetic interference. In some scenarios, the one or more noise sources z may be modeled as additive white Gaussian noise (AWGN) with zero mean. Also, in some applications, channel 104 may be time invariant, meaning that the properties of the channel do not substantially change over an appropriate time scale. For example, an appropriate time scale may be in the millisecond range for real time data transmission systems.

Transmitter 102 may include one or more encoders and modulators to process information bit sequences and produce codewords. For example, an encoder and a modulator may process bit sequences to output codewords. Although the present disclosure is described in terms of binary data, it is understood that bit sequences may be replaced with a sequence of non-binary digits or another type of information-containing symbol without departing from the scope of the present disclosure. In some embodiments, the encoder employs error correction or error detection codes to encode bit sequences. For example, the encoder may encode bit sequences using CRC code, convolutional code, Turbo code, LDPC code, or any other suitable code. The modulator may modulate the bit sequences or the encoded bit sequences based on any appropriate modulation scheme, such quadrature amplitude modulation (QAM), pulse amplitude modulation (PAM), or phase shift keying (PSK). The encoder and modulator may be implemented using separate processors or the same processor.

Receiver 106 may receive signals $y_1$ through $y_M$ using M receiver antennas. These received signals will be collectively referred to as the received vector y, where y may be written as: $y=[y_1, \ldots, y_M]^T$. Receiver 106 may include any suitable number of receiver antennas, and therefore M may be any integer of at least one. Received vector y may include information from one or more of transmitted signals $x_1$ through $x_N$ (which may be represented as a transmitted signal vector $x=[x_1, \ldots, x_N]^T$) that have been attenuated and/or corrupted by channel 104 and noise sources $z_1$ through $z_M$, where one noise source may be used to represent the noise on each of the M receiver antennas. Receiver 106 may process the received signals to produce an output bit sequence. For example, receiver 106 may perform demodulation and decoding to produce the output bit sequence. Alternatively, an output bit sequence may be directed to a demodulator, a decoder, or both (not shown) external to receiver 106.

When transmitter 102 includes multiple transmit antennas and receiver 106 includes multiple receiver antennas, channel 104 may be referred to as a MIMO channel. Due to channel properties, the signal received by each of the receiver antennas may be based on signals from multiple transmit antennas. In particular, a signal received by each receiver antenna may be a linear combination of the signals provided by the transmit antennas. Thus, the received vector y can be modeled by:

$$y=\Sigma_{n=1}^{N}h_n x_n + z \quad \text{(EQ. 1)}$$

where y is the M×1 received vector representing the signals received by the M receiver antennas of receiver 106, and $h_n$ is an effective channel vector for the n-th codeword. The signal $x_n$ is a signal containing the transmit values transmitted by the one or more transmit antennas of transmitter 102, and z is an M×1 signal vector representing additive noise, where z may be written as $z=[z_1, \ldots, z_M]^T$. The effective channel vector $h_n$ may represent the product of the raw channel 104 and a precoding matrix, in which case the number of transmit antennas may be larger than N. Alternatively, the effective channel vector $h_n$ may represent the raw channel 104, in which case N may be equal to the number of transmit antennas. As is described herein and is shown in EQ. 1 for simplicity, the time and frequency indices are omitted, and one data stream for one codeword is used. However, in general, the time and frequency indices may be included in any of the equations and representations herein, and any number of data streams per codeword may be used without departing from the scope of the present disclosure.

Transmitter 102 may send pilot input information 101 to receiver 106 through channel 104. Pilot input information 101 may include one or more pilot signals, i.e., signals that are known to the receiver. Receiver 106 includes a CQI generator circuitry 110, which may process a received pilot information signal to estimate channel information and to generate channel feedback information 112. For example, channel feedback information 112 may be generated by appropriately processing the received pilot information in combination with a channel quality indicator table. In particular, the channel feedback information computed by the receiver is referred to as CQI. CQI values may be based on any suitable channel parameter such as Signal-to-Interference and Noise Ratio (SINR), Signal-to-Noise Ratio (SNR), Signal-to-Noise plus Distortion Ratio (SNDR), power of received signal, supportable data rates, supportable modulation and/or coding rates, supportable throughput, packet error rate (PER) requirements, or any other suitable channel parameter. The CQI values may define certain transmission parameters such as modulation and coding scheme or coding spread. The receiver 106 transmits this channel feedback information 112 (CQI) to the transmitter 102.

A transmission parameter update circuitry 108 within transmitter 102 receives channel feedback information 112 and dynamically adjusts the transmit vector x to achieve certain transmission conditions. For example, transmitter 102 may determine suitable transmission parameters and/or schemes, such as the number of transmit antennas to activate, the modulation and coding rates, and/or the bandwidth allocation to generate channel feedback information corresponding to the current conditions of the transmission channel. The transmission parameters may be determined in order to adjust channel throughput, bit error rate, or both.

As described above, when receiver 106 exhibits non-deterministic behavior, CQI selection may be particularly challenging. However, if the probabilistic distributions of the receiver's behavior are known, then the probabilistic distributions may be considered when CQI is determined. In particular, a variable k denotes a particular receiver behavior associated with a probability. The variable k ranges from 1 to K, where K is the total number of receiver behaviors. In an example, a receiver behavior corresponds to an order in which receiver 106 orders the codewords for decoding. Since receiver 106 may determine the order of decoding based on fluctuating channel information or conditions, the receiver behavior is said to be non-deterministic. In particular, for N codewords, if the receiver behavior is completely determined from the ordering of the decoding, then the total number of possible receiver behaviors K is equal to N!. However, other factors may be included in defining the receiver behavior, such that K may be greater than N!. A performance measure f(k) for each receiver behavior k may represent any suitable measure of the performance of a communication system. In some embodiments, the performance measure f(k) corresponds to a metric indicative of signal-to-interference-plus-noise ratio (SINR), capacity, throughput, outage, any other performance measure associated with a communication system, or any suitable combination thereof.

One technique for improving the performance of a communication system, e.g., of system 100 of FIG. 1, is to use successive interference cancellation (SIC). In SIC, a codeword associated with strong channel conditions may be decoded before other codewords associated with weaker channel conditions, or a codeword associated with the highest or higher probability of correct decoding may be decoded before other codewords. Effects of any successfully decoded codewords may be subtracted from a received signal vector, e.g., received vector y of FIG. 1, to eliminate interference of the decoded codeword on the other codewords.

In some embodiments of the present disclosure, CQI selection is used in systems that use SIC. In particular, the codewords may be coupled to one another, such that the CQI selected for one codeword depends on whether interference from the other codewords is cancelled or not. In an example, CQI selection for different codewords in an SIC system are coupled with one another. For an SIC system, CQI selection for one codeword is dependent on whether interference from other codewords is cancelled. If interference from other codewords is successfully cancelled, the CQI selection may be more aggressive, meaning that there is less interference in the remaining signal and thus better channel quality. On the other hand, if interference from other codewords is not successfully cancelled, then the uncancelled interference may be treated essentially as noise, and the lack of cancellation should be considered when selecting CQI. The decoding of a received codeword is performed after the CQI is determined, such that at the time that CQI selection is performed, details regarding the decoding process are unknown and are difficult to predict. The systems and methods of the present disclosure provide a way to select CQIs for a set of codewords by taking into account the interactions across different codewords (i.e., whether the interference from other codewords is cancelled or not) and the behavior of the receiver.

In a system that uses SIC and selects CQI, a receiver such as receiver 106 determines multiple orderings of received codewords, and computes a total performance measure or objective (such as total throughput or total probability of decoding) for each of the orderings. The total performance objective may be based on computations of codeword-specific performance measures that are based on each individual codeword and its position within the ordering. The total performance objectives are compared across different orderings, and the globally optimal ordering is the ordering that results in the optimum total performance objective (i.e., the maximum total performance objective). As is described in relation to FIG. 3, the globally optimal ordering may be determined using an exhaustive approach, which considers all possible orderings and selects the globally optimal ordering. The exhaustive approach may be challenging to implement when the number of codewords N is large, so simplified approaches may be used. In an example, the description of FIG. 4 relates to a greedy approach that reduces the complexity of the exhaustive approach while achieving similar performance of the exhaustive approach.

Figure 2:
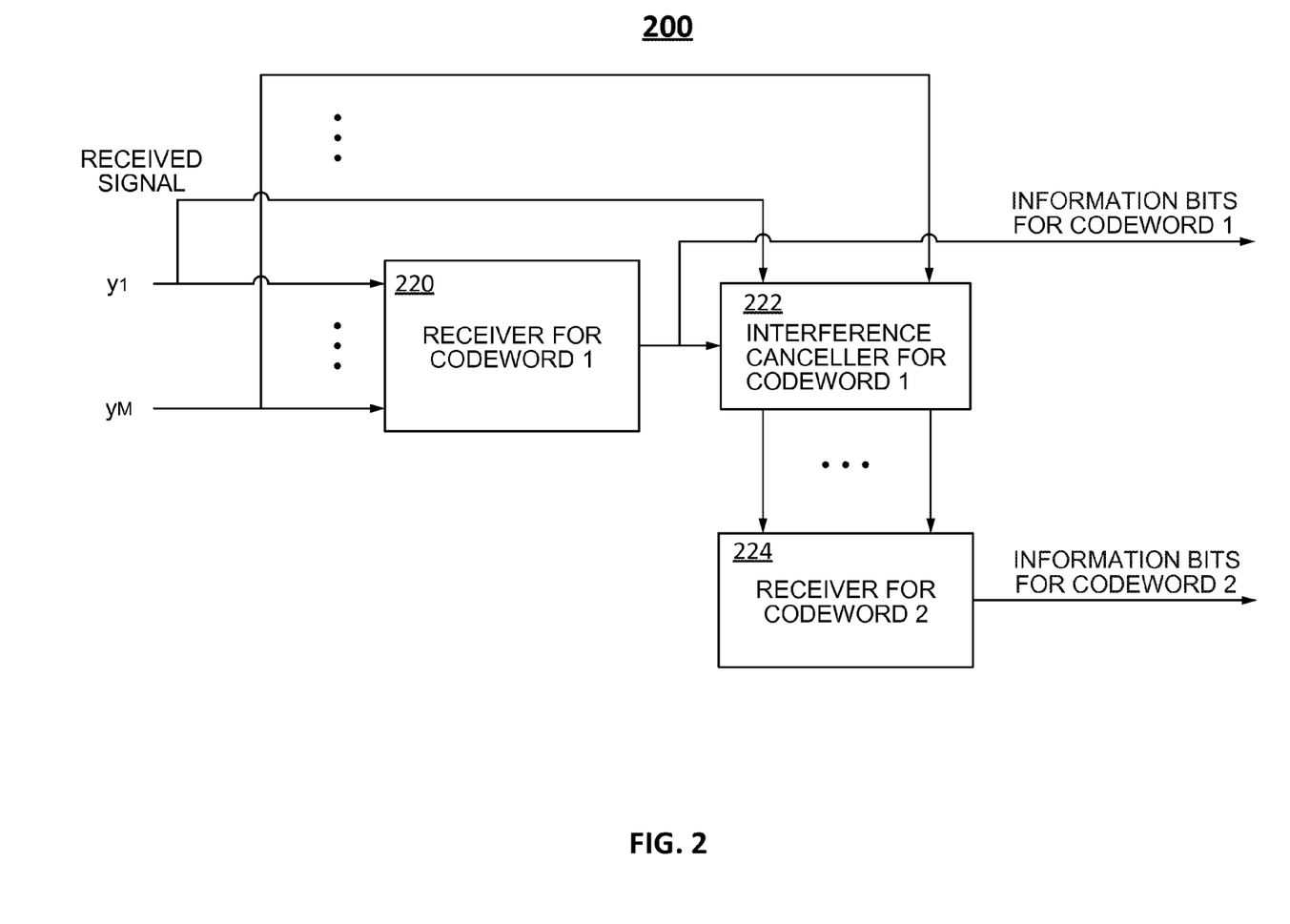
FIG. 2 block diagram of a system that perform successive interference cancellation, in accordance with embodiments of the present disclosure.

FIG. 2 is a block diagram of a system 200 that performs successive interference cancellation (SIC) in a receiver such as receiver 106, in accordance with some embodiments. System 200 includes a first receiver 220 for processing a first codeword, an interference canceller 222, and a second receiver 224 for processing a second codeword. First receiver 220 receives the received signal vector y and attempts to decode the first codeword. If decoding is successful, the information bits for the first codeword are provided by the receiver to interference canceller 222, which subtracts the first codeword from the signal vector y. The remaining signal is transmitted to second receiver 224, which attempts to decode the second codeword. If decoding of the second codeword is successful, the information bits for the second codeword are provided by second receiver 224 to a second interference canceller (not shown), which removes the second codeword from the resulting signal. The process is repeated until all codewords have been decoded. As shown in FIG. 2, only two receivers 220 and 224 for two codewords are shown. However, in general, the systems and methods of the present disclosure are generally applicable to any number of receivers, interference cancellers, and codewords.

In SIC, codewords are successively decoded, where each codeword has interference resulting from previously successfully decoded codewords cancelled. Cancelling the interference from other codewords means that the successfully decoded codewords may be subtracted from the signal, such that the remaining signal is not affected by the decoded codeword, thereby reducing the overall amount of interference in the remaining signal from the other codewords. The order in which the codewords are successively decoded and cancelled is determined by the receiver based on any number of factors, such as varying channel conditions or probability of successful decoding. Because these factors may have random fluctuations, the behavior of the receiver is non-deterministic.

In some embodiments, the receiver exhibits non-deterministic behavior even when the ordering of the codewords is fixed. As an example, the receiver may adaptively select to apply interference cancellation or select to not apply interference cancellation. This selection may be based on reliability information of a codeword that provides an indication of an amount of confidence in a decoding attempt. For example, cyclic redundancy check (CRC) data may provide such reliability information, where the CRC data may be used to determine whether or not decoding is successful. If the CRC data indicates that decoding has been successful, then interference may be cancelled, but otherwise, the receiver may select to not cancel the interference from the current codeword. The use of reliability information to determine whether or not to apply interference cancellation to a signal may lead to additional uncertainty in the receiver behavior.

SIC can be implemented in a number of ways. For example, SIC can be implemented such that all codewords are decoded in parallel or successively. In particular, the codewords may be serially decoded at each stage, or any arbitrary number of codewords may be decoded simultaneously at each stage. Hereafter, and for the purposes of illustration, this disclosure will primarily discuss SIC to illustrate the implementation of CQI selection. The systems and methods of this disclosure, however, may apply to other examples outside of SIC, which may include any type of receivers with non-deterministic behaviors, such as parallel interference cancellation (PIC), hybrid interference cancellation (HIC), sphere decoding, or any other suitable receiver that exhibits non-deterministic behavior.

As described above, one technique for performing CQI selection for a SIC receiver is an exhaustive approach. In an example, the CQIs may be selected based on all possible receiver behaviors using a selection function $J(f(k), k=1 \ldots K)$. The selection function J may dictate selecting the CQI based on any metric, such as the average performance measure over all receiver behaviors, the maximal performance measure over all receiver behaviors, the maximal median performance over all receiver behaviors, the max-min performance over all receiver behaviors, or any other suitable way of determining a selection function. In particular, the selected CQI may be written as the selection function J as follows:

$$CQI = J(f(k), k=1, \ldots, K) \quad (EQ.\ 2)$$

If the ordering of the N codewords is denoted as $\Pi(1), \Pi(2), \ldots, \Pi(N)$, where $\Pi(n)$ corresponds to the codeword that is decoded in the n-th position in the ordering, the updated signal after interference cancellation for the $\Pi(n)$-th codeword may be written as:

$$y_{\Pi(n)} = \left(\sum_{i=1}^{n-1} 1_{\Pi(i)} h_{\Pi(i)} x_{\Pi(i)}\right) + \left(\sum_{i=n}^{N} h_{\Pi(i)} x_{\Pi(i)}\right) + z \quad (EQ.\ 3)$$

where $$1_{\Pi(i)} = \begin{cases} 0 & \text{if codeword } \Pi(i) \text{ is cancelled} \\ 1 & \text{otherwise} \end{cases}$$

According to EQ. 3, the indicator function $1_{\Pi(i)}$ provides an indication whether the $\Pi(i)$-th codeword is cancelled. If so, then the indicator function $1_{\Pi(i)}$ effectively zeroes out or removes the contribution of the $\Pi(i)$-th codeword from the updated signal $y_{\Pi(n)}$. Otherwise, if the $\Pi(i)$-th codeword is not cancelled, the indicator function $1_{\Pi(i)}$ allows the contribution of the $\Pi(i)$-th codeword to remain in the updated signal $y_{\Pi(n)}$.

Because of uncertainty from whether previous codewords were successfully decoded or cancelled, the corresponding effective performance measure f, which may correspond to SINR, throughput, capacity, outage, or any other suitable performance measure, for the $\Pi(n)$-th codeword may be random or uncertain. The distribution of the effective performance measure f may be derived from the channel vectors, signal power, noise power, and CQI values.

Figure 3:
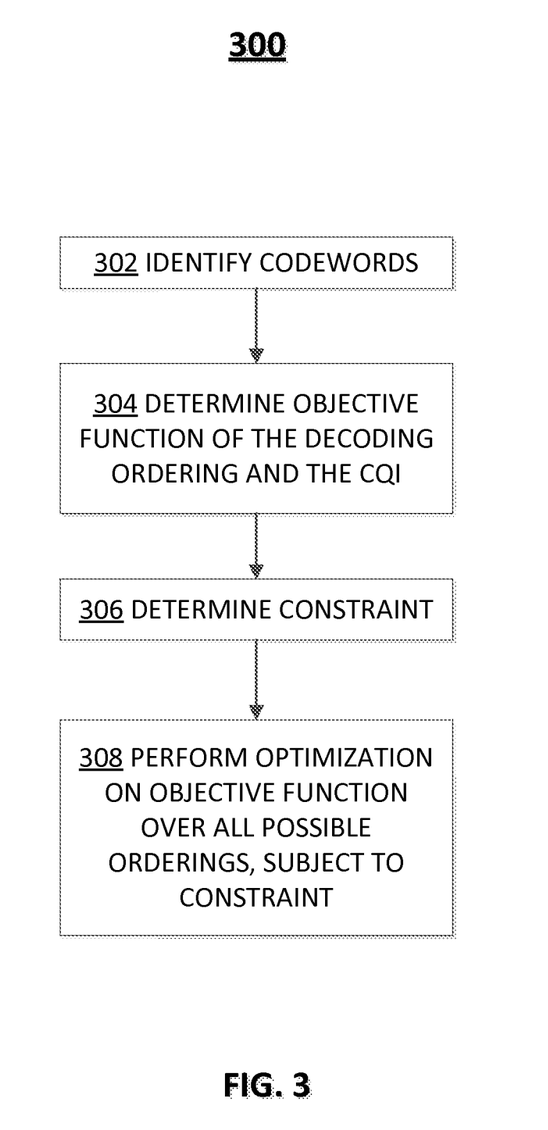
FIG. 3 is a flow chart of a process for performing an exhaustive search for selection of channel quality indicator (CQI), in accordance with embodiments of the present disclosure.

FIG. 3 is a flow diagram illustrating a process 300 for performing CQI selection using an exhaustive approach, in accordance with embodiments of the present disclosure. Process 300 includes 302, 304, 306, and 308, and may be implemented in CQI generator circuitry 110 of receiver 106 of FIG. 1 to determine an optimal CQI selection.

At 302, the N codewords are identified for processing. In particular, the N codewords may be transmitted by a transmitter 102 serially or in parallel over the same channel 104 or different channels in a communication system such as system 100. While the N codewords are received, the receiver may monitor various conditions of the channel and may derive one or more channel vectors, signal power metrics, noise power metrics, or any other suitable values for use in representing a channel.

At 304, an objective function is determined. To determine the objective function, first a performance measure f is selected. The performance measure f may correspond to a suitable measure of the performance of a communication system. In some embodiments, the performance measure f corresponds to a metric indicative of signal-to-interference-plus-noise ratio (SINR), capacity, throughput, outage, any other performance measure associated with a communication system, or any suitable combination thereof. The objective function is a function of the decoding ordering and the CQI, and is used to select the CQIs that give rise to an optimal value for the objective function. In an example, the objective may correspond to total or average values of throughput or capacity. The receiver may apply an optimization technique to obtain a global maximum or a global minimum of the objective function, and appropriately select the CQI value or values that give rise to the optimal value of the objective function.

In one example, the objective function may be a sum of average performance measures:

$$\text{maximize}_{\Pi, CQI} \Sigma_{n=1}^{N} E[f(\Pi(n), CQI_{\Pi(n)})] \quad (EQ.\ 4)$$

The objective function shown in EQ. 4 may be commonly used for its simplicity and ease of understanding. Moreover, the optimization of the objective function shown in EQ. 4 may be subject to a constraint, which is determined at 306. An example constraint may be written as:

$$E[g(\Pi(n), CQI_{\Pi(n)})] \leq b_{\Pi(n)}, n=1, \ldots, N \quad (EQ.\ 5)$$

The constraint shown in EQ. 5 includes a function g, which may refer to any suitable constraint on the system, such as a maximum tolerable amount of error. In an example, the function g corresponds to a block error rate (BLER) constraint for each codeword. The threshold value $b_{\Pi(n)}$ corresponds to a maximum tolerable amount of BLER (or other error value) that may be within each codeword. In general, the value for the threshold $b_{\Pi(n)}$ may be the same or different for different codewords. A BLER constraint is included herein as an illustrative example only, and in general, the optimizations described herein may be subject to any type of constraints, such as packet error rate (PER), bit error rate (BER), delay constraint, or any other suitable type of constraint.

In another example, the optimization may be to maximize a minimum value of an objective function:

$$\underset{CQI}{\text{maximize}} \underset{\Pi}{\text{minimize}} \left(\sum_{n=1}^{N} E[f(\Pi(n), CQI_{\Pi(n)})]\right) \quad (EQ.\ 6)$$

where the optimization shown in EQ. 6 may also be subject to the constraint shown in EQ. 5. In another example, the optimization may be to maximize the average objective function f, where the average objective function is taken over all possible orderings:

$$\text{maximize}_{CQI} E_{\Pi}[\Sigma_{n=1}^{N} E[f(\Pi(n), CQI_{\Pi(n)})]] \quad (EQ.\ 7)$$

And where the optimization shown in EQ. 7 may also be subject to the constraint shown in EQ. 5.

At 308, CQI generator circuitry 110 performs the optimization on the objective function determined at 304 over all possible orderings of the codewords, subject to any constraints determined at 306. In particular, such an optimization may be an exhaustive approach, in which the set of CQIs is jointly selected over all possible orderings of the codewords.

The exhaustive approach is associated with a complexity on the order of $|CQI|^N$, or the N-th power of the cardinality of CQI, which can get prohibitively computationally expensive for large values of N. In particular, in an LTE system, the cardinality of CQI may be around 16.

The following description illustrates a simple example of the exhaustive approach for performing CQI selection for two codewords, when the objective function is based on the performance measure of throughput, and the constraint is a maximum BLER of 10%. When the number of codewords is only two, an exhaustive approach may be feasible because there are only $|CQI|^2$ combinations of CQIs to consider. One of ordinary skill will understand that the systems and methods of the present disclosure are applicable to objective functions based on any suitable performance measure, any suitable constraints, and any number of codewords.

In a simplified two-codeword example, where the objective is throughput and the constraint is a maximum BLER of 10%, the objective function of EQ. 7 and the constraint of EQ. 5 may be rewritten as:

$$\underset{CQI_1, CQI_2}{\text{maximize}}\; Tput(CQI_1)\{p_{1,1} + p_{2,1}(1-p_{1,1})\tilde{p}_{1,2}\} + \quad\quad (EQ.\ 8)$$

$$Tput(CQI_2)\{p_{2,1} + p_{1,1}(1-p_{2,1})\tilde{p}_{2,2}\}$$

subject to:

$$p_{1,1} + p_{2,1}(1-p_{1,1})\tilde{p}_{1,2} \le 10\%$$

$$p_{2,1} + p_{1,1}(1-p_{2,1})\tilde{p}_{2,2} \le 10\% \quad\quad (EQ.\ 9)$$

In EQS. 8 and 9, $p_{1,1}$ and $p_{2,1}$ denote unconditional probabilities, and $\tilde{p}_{1,2}$ and $\tilde{p}_{2,2}$ denote conditional probabilities, which may be derived from the unconditional probabilities, as is described below. In particular, $p_{1,1}$ corresponds to the probability of successful decoding of a first codeword without any interference cancellation, and $p_{2,1}$ corresponds to the probability of successful decoding of a second codeword without any interference cancellation. Furthermore, $\tilde{p}_{1,2}$ corresponds to the conditional probability of successful decoding of codeword 1 conditioned on (1) interference from codeword 2 is cancelled, and (2) decoding fails without interference cancellation. Similarly, $\tilde{p}_{2,2}$ corresponds to the conditional probability of successful decoding of codeword 2 conditioned on (1) interference from codeword 1 is cancelled, and (2) decoding fails without interference cancellation. In general, the values for the unconditional probabilities p and the conditional probabilities $\tilde{p}$ depend on $CQI_1$ and $CQI_2$, and can be determined based on the CQI values and the effective SNRs derived from EQS. 1 and 3.

It may be difficult to pre-compute the conditional probabilities $\tilde{p}$ because doing so would require computing at least two probability values: a first value corresponding to the joint probability that decoding succeeds after interference cancellation and fails before interference cancellation, and a second value corresponding to the probability that decoding fails before interference cancellation. Instead, the conditional probabilities $\tilde{p}$ may be derived from the unconditional probabilities p. In particular, $p_{1,2}$ corresponds to the probability of successful decoding of codeword 1 with interference cancellation of codeword 2, and $p_{2,2}$ corresponds to the probability of successful decoding of codeword 2 with interference cancellation of codeword 1. In contrast to the conditional probabilities $\tilde{p}$, the probabilities $p_{1,2}$ and $p_{2,2}$ are not conditional probabilities requiring that decoding fails without interference cancellation.

Because $p_{1,2}$ corresponds to the probability of successful decoding of codeword 1 with interference from codeword 2 cancelled, $p_{1,2}$ may be written as the sum:

$$p_{1,2} = P\{S \text{ after } IC | S \text{ before } IC\} P\{S \text{ before } IC\} + P\{S \text{ after } IC | F \text{ before } IC\} P\{F \text{ before } IC\} \quad (EQ.\ 10)$$

In EQ. 10, the event "S" corresponds to successful decoding of codeword 1, the event "F" corresponds to failed decoding of codeword 1, and "IC" corresponds to interference cancellation. From EQ. 10, $p_{1,2}$ may be rewritten as:

$$p_{1,2} = p_{1,1} + \tilde{p}_{1,2}(1-p_{1,1}) \quad\quad (EQ.\ 11)$$

From EQ. 11, the conditional probability $\tilde{p}_{1,2}$ may be written as:

$$\tilde{p}_{1,2} = \frac{p_{1,2} - p_{1,1}}{1 - p_{1,1}} \quad\quad (EQ.\ 12)$$

A similar derivation may be used to derive $\tilde{p}_{2,2}$ as:

$$\tilde{p}_{2,2} = \frac{p_{2,2} - p_{2,1}}{1 - p_{2,1}} \quad\quad (EQ.\ 13)$$

Thus, the conditional probabilities $\tilde{p}_{1,2}$ and $\tilde{p}_{2,2}$, which may be difficult to pre-compute, may be easily derived from the unconditional probabilities $p_{1,1}$, $p_{1,2}$, $p_{2,1}$, and $p_{2,2}$. In particular, one or more lookup tables may be used to efficiently retrieve values for the conditional probabilities based on the unconditional probabilities. After the appropriate values for the conditional probabilities and the unconditional probabilities in EQS. 8 and 9 are determined, the optimization in EQS. 8 and 9 may be straightforward to compute to determine appropriate CQI values. The above example describes a simple illustration of the exhaustive approach for only two codewords. In general, the exhaustive approach may be used for larger numbers of codewords, but may be computationally complex to implement.

An alternative approach to the exhaustive search is a greedy search technique. The greedy search has linear complexity and for large values of n, the greedy search is much simpler than the exhaustive approach. Rather than performing joint selection over the entire set of all possibilities, the greedy technique uses a simpler objective function than those used in the exhaustive approach and selects codewords iteratively.

Figure 4:
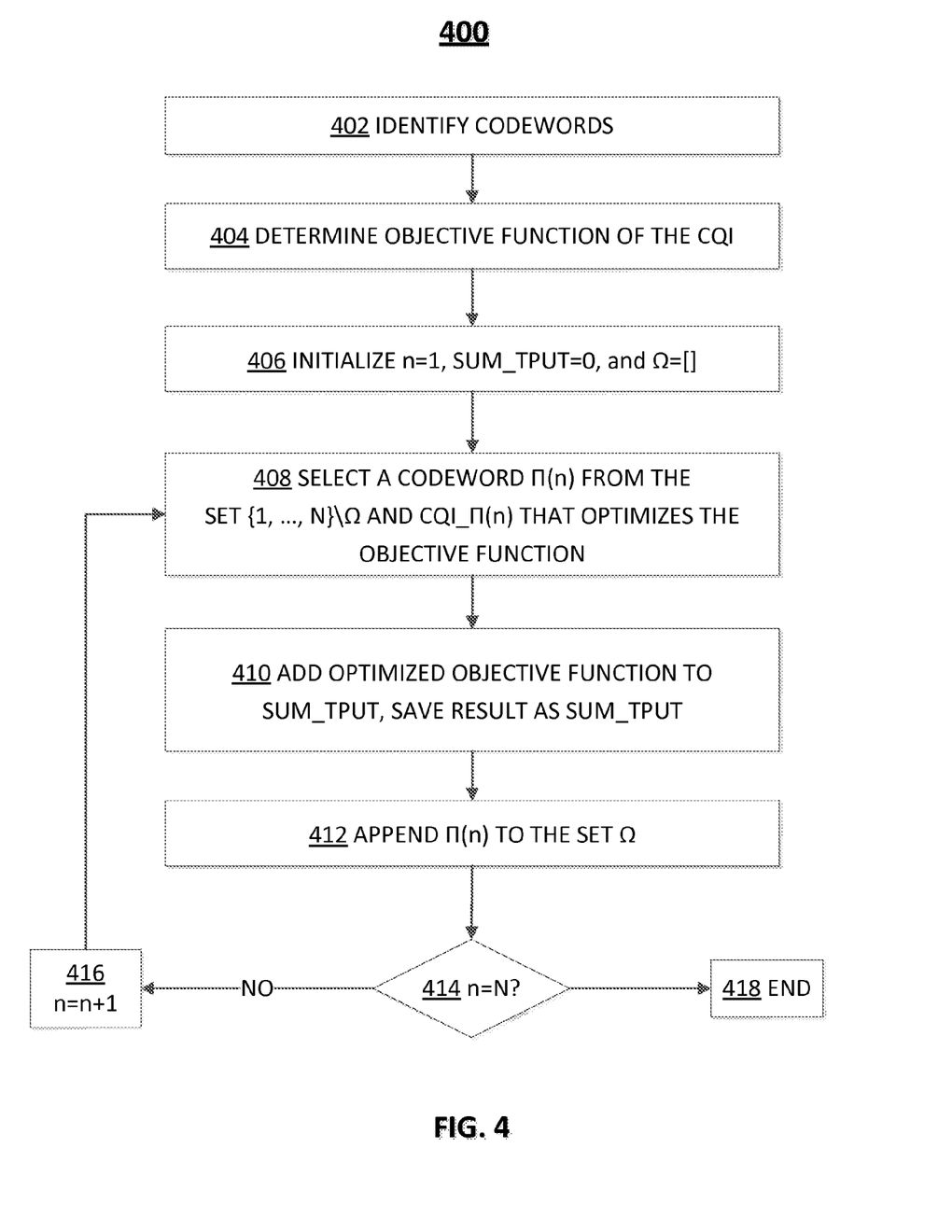
FIG. 4 is a flow chart of a process for performing a greedy search for CQI selection, in accordance with embodiments of the present disclosure.

FIG. 4 is a flow diagram illustrating a process 400 for performing CQI selection using a greedy approach, in accordance with embodiments of the present disclosure. Process 400 includes 402, 404, 406, 408, 410, 412, 414, 416, and 418, and may be implemented in CQI generator circuitry 110 of receiver 106 of FIG. 1. As described herein, the greedy approach has linear complexity with the cardinality of the CQI. However, in general, the complexity of the greedy approach may have any shape or value, but is less than $|CQI|^N$ for large values of N.

At 402, a set of N codewords is identified for processing. The process performed at 402 may be equivalent to the process performed at 302 of FIG. 3. In particular, the N codewords may be transmitted by a transmitter 102 serially or in parallel over the same channel 104 or different channels in a communication system such as system 100. While the N codewords are received, the receiver may monitor various conditions of the channel and may derive one or more channel vectors, signal power metrics, noise power metrics, or any other suitable values for use in representing a channel.

At 404, an objective function is determined. The process performed at 404 may be equivalent to the process performed at 304 of FIG. 3. In particular, to determine the objective function, first a performance measure f is selected. The performance measure f may correspond to a suitable measure of the performance of a communication system. In some embodiments, the performance measure f corresponds to a metric indicative of signal-to-interference-plus-noise ratio (SINR), capacity, throughput, outage, any other performance measure associated with a receiver, or any suitable combination thereof.

While the objective function for the exhaustive approach in FIG. 3 is a function of the decoding ordering and the CQI, the objective function in the greedy technique may be based only on CQI and not the decoding ordering. The objective function is used to select the CQIs that give rise to an optimal value for the objective function. In an example, the objective may correspond to total or average values of throughput or capacity. The receiver may apply an optimization technique to obtain a maximum or a minimum of the objective function, and appropriately select the CQI value or values that give rise to the optimal value of the objective function. For example, the objective function determined at 404 may correspond to an average throughput value $E[\text{TPUT}(\text{CQI}_{\Pi(n)})]$. In contrast to the objective function used in the exhaustive approach described in relation to FIG. 3, the objective function determined in the greedy technique at 404 may be simpler and based on $\text{CQI}_{\Pi(n)}$ instead of being a function of both $\Pi(n)$ as well as $\text{CQI}_{\Pi(n)}$. Thus, the objective function determined at 404 may be simpler than the objective function determined at 304 in the exhaustive approach.

At 406, an iteration counter n is initialized to 1, a performance measure SUM TPUT (sum throughput), is initialized to zero, and a set of previously selected codewords $\Omega$ is initialized to the empty set $\Pi$.

At 408, an n-th codeword $\Pi(n)$ is selected from the set $\Pi(n) \in \{1, \ldots, N\} \setminus \Omega$, which corresponds to the set of all N codewords, except for those in the set defined by $\Omega$. In the first iteration when n=1, $\Omega$ is empty so that all codewords are considered. Moreover, the value for $\text{CQI}_{\Pi(n)}$ is also selected. Both the n-th codeword $\Pi(n)$ and $\text{CQI}_{\Pi(n)}$ are selected at 408 to optimize the objective function, which may include maximizing $E[\text{TPUT}(\text{CQI}_{\Pi(n)})]$, for example. At 410, the value of the sum throughput, or SUM TPUT is incremented and saved to reflect the optimized value for the objective function, or $\text{SUM}_{TPUT} = \text{SUM}_{TPUT} + E[\text{TPUT}(\text{CQI}_{\Pi(n)})]$. At 412, the selected codeword $\Pi(n)$ is appended to the set $\Omega$, such that $\Omega = \{\Omega, \Pi(n)\}$.

At 414, the value of the iteration counter n is compared to the number of codewords N. If n is not equal to N, the value of n is incremented at 416, and process 400 returns to 408 to select the next codeword $\Pi(n)$ from the remaining set $\{1, \ldots, N\} \setminus \Omega$. 408, 410, 412, 414, and 416 are repeated in this manner until the iteration counter n is equal to the number of codewords N. When the N-th iteration has been performed, this means that all the codewords 1 through N have been selected, and process 400 ends at 418.

In some embodiments, for each iteration n that includes performing processes at 408, 410, 412, 414, and 416, when the expected throughput is calculated at 408, the impact of the interference cancellation performed in the previous iterations may be considered in updating one or more channel conditions. In an example, if interference from a previous codeword is cancelled, then the SINR may be updated to reflect the cancellation and to reflect an updated channel condition.

An implementation of the greedy search is described below for a simple two codeword example. In the greedy search, the CQI selection for two codewords is reduced to just two steps. First, one of the two codewords is selected. The codeword $\Pi(1) \in \{1,2\}$ and $\text{CQI}_{\Pi(1)}$ are selected such that:

$$E[\text{TPUT}(\text{CQI}_{\Pi(1)})] = p_{1,1} \text{TPUT}(\text{CQI}_{\Pi(1)})$$

is maximized. Then, a value for the $\text{CQI}_{\Pi(2)}$ is determined that maximizes:

$$E[\text{TPUT}(\text{CQI}_{\Pi(2)})] = (p_{2,1} + p_{1,1}(1-p_{2,1})\tilde{p}_{2,2}) \text{TPUT}(\text{CQI}_{\Pi(2)}).$$

In this example, the computational complexity of the CQI selection has been reduced from $|\text{CQI}|^2$ (for the exhaustive search) to $2 \times |\text{CQI}|$ (for the greedy search). In general, compared to the exhaustive approach, the greedy search technique described in relation to FIG. 4 is much less computationally complex, yet may result in nearly the same performance as the exhaustive approach.

Figure 5:
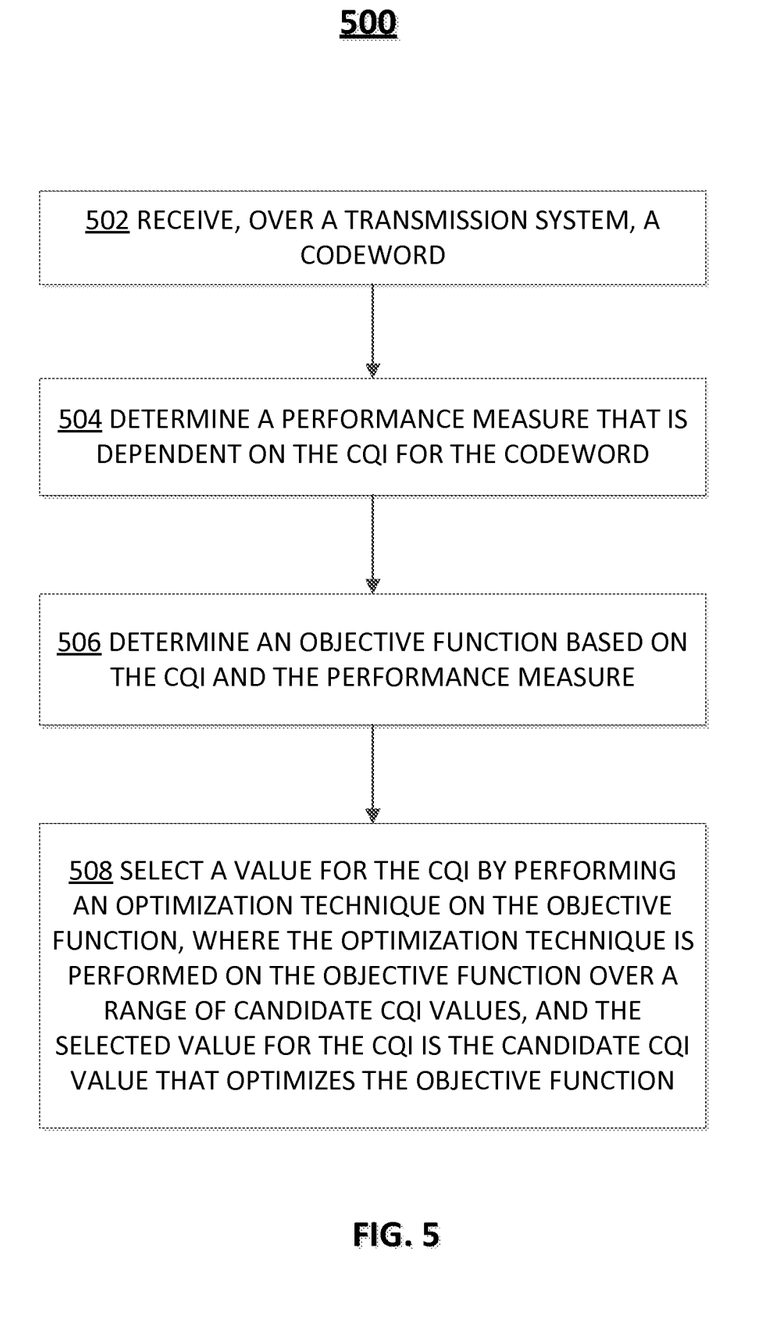
FIG. 5 is a high level flow chart of a process for determining CQI for a non-deterministic receiver, in accordance with embodiments of the present disclosure.

FIG. 5 is a flow diagram illustrating a process 500 for determining CQI in accordance with embodiments of the present disclosure. Process 500 includes 502, 504, 506, and 508, and may be implemented in CQI generator circuitry 110 of receiver 106 of FIG. 1.

At 502, a codeword is received over a transmission system at a receiver. The process performed at 502 may be equivalent to the process performed at 302 of FIG. 3 or at 402 of FIG. 4. One or more codewords may be transmitted by transmitter 102 over the channel 104 or different channels in the transmission system such as system 100. While the one or more codewords are received, the receiver may monitor various conditions of the channel and may derive one or more channel vectors, signal power metrics, noise power metrics, or any other suitable values for use in representing a channel.

At 504, performance measure that is dependent on the CQI for the codeword received at 502 is determined. The performance measure f may correspond to a suitable measure of how well the receiver is able to successfully decode the received codewords. In some embodiments, the performance measure f corresponds to a metric indicative of signal-to-interference-plus-noise ratio (SINR), capacity, throughput, outage, any other performance measure associated with a receiver, or any suitable combination thereof.

At 506, an objective function based on the CQI and the performance measure determined at 504 is determined. If an exhaustive approach such as that described in relation to FIG. 3 is used, the objective function may be a function of the decoding ordering and the CQI. Alternatively, if a greedy approach such as that described in relation to FIG. 4 is used, the objective function may be a function of the CQI and not of the decoding ordering. In general, the objective function is used to select the CQIs that give rise to an optimal value for the objective function. In an example, the objective may correspond to total or average values of throughput or capacity. In some embodiments, the objective function is subject to a constraint based on CQI, such as the constraint described in EQ. 5.

At 508, a value for the CQI is selected by performing an optimization technique on the objective function. In particular, the receiver may apply an optimization technique to obtain a global maximum or a global minimum of the objective function, and appropriately select the CQI value or values that give rise to the optimal value of the objective function. In an example, the optimization technique is performed on the objective function over a range of candidate CQI values, and the selected value for the CQI is the candidate CQI value that optimizes the objective function.

When the receiver takes an exhaustive approach to CQI selection, a set of values for the CQIs of all the codewords is jointly selected, where the joint selection is based on optimizing the objective function determined at 506. This process is described in detail in relation to FIG. 3. When the receiver takes a greedy approach for CQI selection, N codewords may be received at 502, and a CQI for each received codeword is iteratively selected based on an optimization of the objective function. This process is described in detail in relation to FIG. 4.

In some embodiments, the optimization technique is performed by determining a set of probabilities representative of likelihoods of successful decoding of the one or more received codewords. In particular, the probabilities may be conditional probabilities or unconditional probabilities, and the conditional probabilities may be derived from the unconditional probabilities as described in relation to FIGS. 3 and 4.

It should be understood that the above steps of the flowcharts of FIGS. 3-5 may be executed or performed in any order or sequence not limited to the order and sequence shown and described in the figure. Also, some of the above steps of processes 300, 400, and/or 500 may be executed or performed substantially simultaneously where appropriate or in parallel to reduce latency and processing times. Any of the steps in these processes may be omitted, modified, combined, and/or rearranged, and any additional steps may be performed, without departing from the scope of the present disclosure. Further aspects of the present disclosure relate to one or more of the following clauses.

In some embodiments, the present disclosure relates to a method for determining a channel quality indicator (CQI) in a transmission system. The method comprises receiving, over the transmission system at a receiver, a codeword and determining, at the receiver, a performance measure that is dependent on the CQI for the codeword. The receiver determines an objective function, wherein the objective function is based on the CQI and the performance measure, and selects a value for the CQI by performing an optimization technique on the objective function. The optimization technique is performed on the objective function over a range of candidate CQI values, and the selected value for the CQI is the candidate CQI value that optimizes the objective function.

The method may further comprise receiving N codewords and determining an order of the N codewords for decoding, wherein the order is determined based on one or more conditions of the transmission system. The N codewords may be received over the transmission system. The receiver may attempt to decode each of the N codewords and remove a contribution of a respective codeword from a signal when the attempt to decode the respective codeword is successful.

In some embodiments, selecting the value for the CQI comprises jointly selecting a plurality of values for the CQI that optimize the objective function.

The optimization technique on the objective function may be subject to a constraint based on the CQI. The optimization technique may comprise determining a plurality of probabilities representative of likelihoods of successful decoding of the codeword. In this case, the plurality of probabilities may comprise conditional probabilities and unconditional probabilities, wherein the conditional probabilities are obtained based at least in part from the unconditional probabilities.

In some embodiments, the method further comprises receiving N codewords, and iteratively selecting a CQI for each received codeword based on the objective function. In this case, an aggregate value of the performance measure may be iteratively updated after the CQI for each received codeword is iteratively selected.

The performance measure may be selected from the group consisting of: signal-to-interference-plus-noise ratio, capacity, throughput, and outage.

In some embodiments, the present disclosure relates to a system for determining a channel quality indicator (CQI) in a transmission system. The system comprises receiver circuitry having a processor. The processor is configured to receive a codeword over the transmission system and determine a performance measure that is dependent on the CQI for the codeword. The processor is also configured to determine an objective function, wherein the objective function is based on the CQI and the performance measure, and select a value for the CQI by performing an optimization technique on the objective function. The optimization technique is performed on the objective function over a range of candidate CQI values, and the selected value for the CQI is the candidate CQI value that optimizes the objective function.

The processor may be further configured to receive N codewords, and determine an order of the N codewords for decoding, wherein the order is determined based on one or more conditions of the transmission system. The processor may further be configured to receive N codewords over the transmission system, attempt to decode each of the N codewords, and remove a contribution of a respective codeword from a signal when the attempt to decode the respective codeword is successful.

In some embodiments, the processor selects the value for the CQI by jointly selecting a plurality of values for the CQI that optimize the objective function.

The optimization technique on the objective function may be subject to a constraint based on the CQI. The optimization technique may comprise determining a plurality of probabilities representative of likelihoods of successful decoding of the codeword. In this case, the plurality of probabilities may comprise conditional probabilities and unconditional probabilities, wherein the conditional probabilities are obtained based at least in part from the unconditional probabilities.

In some embodiments, the processor is further configured to receive N codewords and iteratively select a CQI for each received codeword based on the objective function. In this case, the processor is further configured to iteratively update an aggregate value of the performance measure after the CQI for each received codeword is iteratively selected.

The performance measure may be selected from the group consisting of: signal-to-interference-plus-noise ratio, capacity, throughput, and outage.

The foregoing describes systems and methods for reliable and efficient information transmission. Those skilled in the art will appreciate that the disclosed methods and systems can be practiced by other than the described embodiments, which are presented for the purpose of illustration rather than of limitation. Modifications and variations are possible in light of the above teachings or may be acquired from practice of the disclosed methods and systems. While certain components of this disclosure have been described as implemented in hardware and others in software, other configurations may be possible.

What is claimed is:

1. A method for determining a channel quality indicator (CQI) in a transmission system, the method comprising:
receiving, over the transmission system at a receiver, a codeword;
determining, at the receiver, a performance measure that is dependent on the CQI for the codeword;
determining, at the receiver, an objective function, wherein the objective function is based on the performance measure; and selecting, at the receiver, a value for the CQI by performing an optimization technique on the objective function,
wherein the optimization technique is performed on the objective function over a range of candidate CQI values, the optimization technique comprises determining at least one probability representative of a likelihood of successful decoding of the codeword, and the selected value for the CQI is the candidate CQI value that optimizes the objective function.

2. The method of claim 1, further comprising:
receiving, at the receiver, N codewords; and
determining, at the receiver, an order of the N codewords for decoding, wherein the order is determined based on one or more conditions of the transmission system.

3. The method of claim 1, further comprising:
receiving, at the receiver, N codewords over the transmission system;
attempting to decode each of the N codewords; and
removing a contribution of a respective codeword from a signal when the attempting to decode the respective codeword is successful.

4. The method of claim 1, wherein selecting the value for the CQI comprises jointly selecting a plurality of values for the CQI that optimize the objective function.

5. The method of claim 1, wherein the received codeword is a first codeword, and the optimization technique on the objective function is based on the first codeword and at least a second codeword.

6. The method of claim 1, wherein the at least one probability comprises an unconditional probability of successful decoding of the codeword and a conditional probability of successful decoding of the codeword.

7. The method of claim 6, wherein the conditional probability is obtained based at least in part from the unconditional probability.

8. The method of claim 1, further comprising receiving N codewords, and iteratively selecting a CQI for each received codeword based on the objective function.

9. The method of claim 8, further comprising iteratively updating an aggregate value of the performance measure after the CQI for each received codeword is iteratively selected.

10. The method of claim 1, wherein the performance measure is selected from the group consisting of: signal-to-interference-plus-noise ratio, capacity, throughput, and outage.

11. A system for determining a channel quality indicator (CQI) in a transmission system, the system comprising:
receiver circuitry having a processor, wherein the processor is configured to receive a codeword over the transmission system,
determine a performance measure that is dependent on the CQI for the codeword,
determine an objective function, wherein the objective function is based on the performance measure, and
select a value for the CQI by performing an optimization technique on the objective function, wherein the optimization technique comprises determining at least one probability representative of a likelihood of successful decoding of the codeword, the optimization technique is performed on the objective function over a range of candidate CQI values, and the selected value for the CQI is the candidate CQI value that optimizes the objective function.

12. The system of claim 11, wherein the processor is further configured to:
receive N codewords; and
determine an order of the N codewords for decoding, wherein the order is determined based on one or more conditions of the transmission system.

13. The system of claim 11, wherein the processor is further configured to:
receive N codewords over the transmission system;
attempt to decode each of the N codewords; and
remove a contribution of a respective codeword from a signal when the attempt to decode the respective codeword is successful.

14. The system of claim 11, wherein processor selects the value for the CQI by jointly selecting a plurality of values for the CQI that optimize the objective function.

15. The system of claim 11, wherein the received codeword is a first codeword, and the optimization technique on the objective function is based on the first codeword and at least a second codeword.

16. The system of claim 11, wherein the at least one probability comprises an unconditional probability of successful decoding of the codeword and a conditional probability of successful decoding of the codeword.

17. The system of claim 16, wherein the conditional probability is obtained based at least in part from the unconditional probability.

18. The system of claim 11, wherein the processor is further configured to receive N codewords and iteratively select a CQI for each received codeword based on the objective function.

19. The system of claim 18, wherein the processor is further configured to iteratively update an aggregate value of the performance measure after the CQI for each received codeword is iteratively selected.

20. The system of claim 11, wherein the performance measure is selected from the group consisting of: signal-to-interference-plus-noise ratio, capacity, throughput, and outage.

* * * * *